United States Patent [19]

Key et al.

[11] Patent Number: 5,665,470

[45] Date of Patent: Sep. 9, 1997

[54] GLASS FIBERS AND FIBER-REINFORCED PLASTICS

[75] Inventors: Charles R. Key, Simpsonville, S.C.; Yen-Jer Shih, Belle Mead, N.J.

[73] Assignee: National Starch and Chemical Investment Holding Corporation, Wilmington, Del.

[21] Appl. No.: 558,299

[22] Filed: Nov. 15, 1995

Related U.S. Application Data

[62] Division of Ser. No. 280,912, Jul. 27, 1994, Pat. No. 5,491,182.

[51] Int. Cl.$^6$ ........................................ C08K 9/04
[52] U.S. Cl. ........................ 428/378; 523/206; 523/217
[58] Field of Search ............................ 523/206, 217; 428/378

[56] References Cited

U.S. PATENT DOCUMENTS

| | | | |
|---|---|---|---|
| 3,652,326 | 3/1972 | Ward | 117/126 GE |
| 3,865,768 | 2/1975 | Mohr | 260/23 AR |
| 3,920,313 | 11/1975 | Wong et al. | 350/96 B |
| 3,933,711 | 1/1976 | Motsinger et al. | 260/29.6 MM |
| 3,997,306 | 12/1976 | Hedden | 65/3 C |
| 4,126,729 | 11/1978 | Richardson et al. | 428/389 |
| 4,176,108 | 11/1979 | Caimi et al. | 260/29.6 TA |
| 4,457,970 | 7/1984 | Das et al. | 428/290 |
| 4,546,880 | 10/1985 | Reese | 206/410 |
| 4,789,593 | 12/1988 | Das | 428/391 |
| 5,120,780 | 6/1992 | Martino et al. | 524/188 |
| 5,491,182 | 2/1996 | Key et al. | 523/206 |

OTHER PUBLICATIONS

Carcamo, J.M.; Arranz, F.; "Internal Plasticization of Vinyl Polyacetate by Copolymerization of Vinyl Acetate with Acrylic Esters that Have Polar Groups in Their Structure". Rev. Plast. Mod. vol. 22, No. 165, 1683–1688 (Nov. 1971 (Translated from Spanish).

*Primary Examiner*—Mark D. Sweet
*Attorney, Agent, or Firm*—William K. Wissing

[57] ABSTRACT

The present invention is directed to sizing compositions for use on glass fibers which are used to reinforce lamination resins used in the formation of glass laminates. The sizing compositions contain a low molecular weight, polymer latex prepared by polymerizing at least one monomer(s) selected from the group consisting of acrylic acid, methacrylic acid, $C_1$–$C_{18}$ alkyl esters of acrylic acid, $C_1$–$C_{18}$ alkyl esters of methacrylic acid, glycidyl acrylate, glycidyl methacrylate, $C_1$–$C_4$ hydroxyalkyl esters of acrylic acid, $C_1$–$C_4$ hydroxyalkyl esters of methacrylic acid, vinyl esters of saturated aliphatic monocarboxylic acids containing up to 10 carbon atoms, (meth)acrylamide and their N-substituted derivatives, vinyl ethers, N-vinyl lactams, halogenated vinyl compounds, alkyl vinyl ketones, (meth)allyl ester of saturated aliphatic monocarboxylic acids, vinyl compounds such as vinyl pyrrole, olefins, diesters of itaconic, maleic and/or fumaric acid, and styrene. The polymers have a molecular weight effective to provide both improved wettability of the glass fibers by the lamination resins and improved clarity of reinforced glass laminates prepared from the sized glass fibers and the lamination resins, when compared to sizing compositions known heretofore. The invention is also directed to glass fibers treated with such compositions, and fiber-reinforced plastics prepared from such treated glass fibers.

2 Claims, No Drawings

GLASS FIBERS AND FIBER-REINFORCED PLASTICS

This application is a division, of application Ser. No. 08/280,912, filed Jul. 27, 1994 now U.S. Pat. No. 5,491,182.

FIELD OF THE INVENTION

This invention relates to novel compositions for sizing glass fibers, glass fibers treated with the sizing compositions and fiber-reinforced plastics prepared from such sized glass fibers.

BACKGROUND OF THE INVENTION

The sizing of glass fibers which are used to reinforce plastic resin matrices is well known. For instance, U.S. Pat. No. 3,997,306 discloses glass fiber size which contains a phenolic epoxy resin, the reaction product of the partial ester of a polycarboxylic acid containing one or more unesterified carboxyl groups with a compound containing more than one epoxy group, an amino silane coupling agent, a methacryloxy alkyl trialkoxy silane, and a non-ionic surface active agent.

U.S. Pat. No. 4,126,729 discloses gun roving glass fibers coated with an aqueous-based size comprising an epoxidized polyvinyl acetate copolymer in combination with a vinyl acetate-ethylene copolymer and a vinyl acetate copolymer.

U.S. Pat. No. 4,457,970 discloses treated glass fiber strands with improved processing characteristics. The treated glass fiber strands have on the glass fibers comprising the glass fiber strand an aqueous treating composition or a dried residue thereof. The treating composition has a vinyl-containing coupling agent, an epoxidized thermoplastic polymer or copolymer, an organo-reactable silane coupling agent in an unhydrolyzed and/or partially hydrolyzed condition or an interaction product of the epoxidized polymer or copolymer an organo-reactable silane coupling agent, and a glass fiber lubricant. U.S. Pat. No: 4,789,593 discloses glass fibers treated with an aqueous chemical treating composition having a polar thermoplastic film-forming polymer, coupling agent and lubricant. The aqueous emulsion of the thermoplastic film forming polymer has an average amount of aliphatic unsaturation of less than around 1.5 aliphatic double bonds/mole of polymer and has a ratio of aliphatic unsaturation to aromatic unsaturation not to exceed 0.1.

It is desirable to develop sizing compositions which provide better wettability of glass fibers by plastic resins than sizing compositions noted herein above. It is further desirable to develop sizing compositions which, when applied to glass fibers or strands which are used to reinforce plastic resin matrices, yield fiber-reinforced plastics (FRP) produced from the reinforced plastic resin matrices which have better clarity than laminates produced from polymeric matrices reinforced with glass fibers or strands treated with sizing compositions known heretofore.

SUMMARY OF THE INVENTION

The present invention is directed to sizing compositions for use on glass fibers which are used to reinforce plastic resins used in the formation of fiber-reinforced plastics (FRP). The sizing compositions comprise a low molecular weight polymer prepared by polymerizing at least one monomer(s) selected from the group consisting of acrylic acid, methacrylic acid, $C_1$–$C_{18}$ a alkyl esters of acrylic acid, $C_1$–$C_{18}$ alkyl esters of methacrylic acid, glycidyl acrylate, glycidyl methacrylate, $C_1$–$C_4$ hydroxyalkyl esters of acrylic acid, $C_1$–$C_4$ hydroxyalkyl esters of methacrylic acid, vinyl esters of saturated aliphatic monocarboxylic acids containing up to 10 carbon atoms, (meth)acrylamide and their N-substituted derivatives, vinyl ethers, N-vinyl lactams, halogenated vinyl compounds, alkyl vinyl ketones, (meth) allyl ester of saturated aliphatic monocarboxylic acids, vinyl compounds such as vinyl pyrrole, olefins, diesters of itaconic, maleic and/or fumaric acid, and styrene. The polymers have a molecular weight effective to provide both improved wettability of the glass fibers by the plastic resins and improved clarity of FRPs prepared from the sized glass fibers and the plastic resins, when compared to sizing compositions known heretofore. The invention is also directed to glass fibers treated with such compositions FRPs prepared from such treated glass fibers.

DETAILED DESCRIPTION OF THE INVENTION

The present invention relates to sizing compositions which are used to treat glass fibers which are subsequently used to reinforce plastic resins in the preparation of fiber-reinforced plastics (FRPs). As used herein, glass fibers collectively refers to continuous glass fiber filaments formed by the attenuation of a stream, or streams, of molten glass, to strands formed when continuous glass fiber filaments are gathered together in forming and to glass rovings formed from the glass strands. As used herein, plastic resin refers to thermoplastic or thermosetting resins typically used to prepare FRPs. Examples of such plastic resins include, without limitation, styrenated polyester and vinyl ester resins. An exemplary unsaturated polyester resin dissolved in styrene and methyl methacrylate is MR 17090, available from Aristech Chemical Corporation, Pittsburgh, Pa. As used herein, FRP refers to plastic resin matrices which have been reinforced with glass fibers which have been treated with glass-size compositions.

Such sizing compositions typically comprise a thermoplastic, film-forming resin used as a forming binder for the glass fibers used in preparation of the FRPs. In the present invention, the resin comprises low molecular weight polymers, preferably prepared by emulsion polymerization of at least one monomer(s) selected from the group consisting of acrylic acid, methacrylic acid, $C_1$–$C_{18}$ alkyl esters of acrylic acid, $C_1$–$C_{18}$ alkyl esters of methacrylic acid, glycidyl acrylate, glycidyl methacrylate, $C_1$–$C_4$ hydroxyalkyl esters of acrylic acid, $C_1$–$C_4$ hydroxyalkyl esters of methacrylic acid, vinyl esters of saturated aliphatic monocarboxylic acids containing up to 10 carbon atoms such as vinyl acetate, (meth)acrylamide and their N-substituted derivatives such as N-mono and N-dimethyl, -ethyl, -propyl, and -butyl acrylamide, vinyl ethers such as butyl vinyl ether, N-vinyl lactams such as N-vinyl pyrrolidinone, halogenated vinyl compounds such as vinyl chloride and vinylidene chloride, alkyl vinyl ketones such as methyl or ethyl vinyl ketone, (meth)allyl ester of saturated aliphatic monocarboxylic acids such as allyl and methallyl acetates, propionates and valerates, vinyl compounds such as vinyl pyrrole, olefins such as ethylene, diesters such as dimethyl, diethyl, dipropyl, dibutyl, diphenyl, dibenzyl and di(phenylethyl) itaconate, maleate and/or fumarate and styrene. Preferably, the monomer(s) is selected from the group consisting of ethyl acrylate, butyl acrylate, methyl methacrylate, glycidyl methacrylate, hydroxypropyl acrylate, vinyl acetate and styrene.

In certain preferred embodiments, the polymer will comprise the emulsion polymerization product of a major proportion of at least one acrylic monomer(s) selected from the group consisting of $C_1$–$C_{18}$ alkyl esters of acrylic or methacrylic acid, preferably a combination of two or more $C_1$–$C_4$ alkyl esters of acrylic and/or methacrylic acid. In such embodiments, the $C_1$–$C_{18}$ alkyl ester monomer(s) may be copolymerized with copolymerizable monomer(s) selected from the group consisting of acrylic acid, methacrylic acid, glycidyl acrylate, glycidyl methacrylate, $C_1$–$C_4$ hydroxyalkyl esters of acrylic acid, $C_1$–$C_4$ hydroxyalkyl esters of methacrylic acid, vinyl acetate and styrene.

In other preferred embodiments, the polymers will comprise the emulsion polymerization product of a major proportion of a vinyl ester monomer, such as vinyl acetate. Such vinyl ester monomers may be copolymerized with other copolymerizable monomer(s) selected from the group consisting of acrylic acid, methacrylic acid, $C_1$–$C_{18}$ alkyl esters of acrylic acid, $C_1$–$C_{18}$ alkyl esters of methacrylic acid, glycidyl acrylate, glycidyl methacrylate, $C_1$–$C_4$ hydroxyalkyl esters of acrylic acid and $C_1$–$C_4$ hydroxyalkyl esters of methacrylic acid.

In still other embodiments, the polymers may consist of vinyl acetate homopolymers or interpolymers of one or more monomer(s) selected from the group consisting of $C_1$–$C_{18}$ alkyl esters of acrylic and methacrylic acid monomers.

The polymers utilized in the sizing compositions will have a molecular weight which is effective to provide both improved wettability of the glass fibers by the plastic resins and improved clarity of FRPs prepared from glass fibers which have been treated with the inventive sizing compositions, compared to glass fibers which have been treated with sizing compositions known heretofore and FRPs prepared therefrom. Preferably, the polymers will have a weight average molecular weight of no more than about 55,000, as determined by Gel Permeation Chromotography.

As one skilled in the art will appreciate, molecular weight determinations are typically measured relative to some standard. As one skilled in the art also will appreciate, intrinsic viscosity is one property of polymers which is proportional to the molecular weight, number average or weight average. Therefore intrinsic viscosity is used herein to define the weight average molecular weight range of the polymers utilized in the sizing compositions of the present invention. It is preferred that the polymers have an intrinsic viscosity of less than about 0.4 dL/g. It is more preferred that the intrinsic viscosity of the polymers is less than about 0.35 dL/g.

The polymers utilized in the sizing compositions must be capable of forming non-tacky films on the glass fibers under conditions normally encountered during the sizing process. Tacky films may build-up on equipment used in processing the treated glass fibers, such as choppers, rollers and the like, which is undesirable. Preferably, the polymers will form non-tacky films under ambient conditions, i.e., room temperature. Accordingly, the glass transition (Tg) of the polymers will be effective to form such non-tacky films under such noted conditions. The polymers will have a Tg of from about −10° C. to about 70° C., preferably from about −10° C. to about 40° C., more preferably from about 5° C. to about 30° C.

The polymers utilized in the sizing compositions may be prepared via solution polymerization methods known to those skilled in the art. Preferably, the polymers are prepared via emulsion polymerization methods known to those skilled in the art. The monomers or comonomers are dispersed into water and surfactant with agitation sufficient to emulsify the mixture. The aqueous medium may also contain a free radical polymerization catalyst or other ingredients that are known and conventionally employed in the art as emulsion polymerization aids.

Suitable free radical polymerization catalysts are the catalysts known to promote emulsion polymerization and include water-soluble oxidizing agents, such as organic peroxides, inorganic oxidating agents and those catalysts that are activated in the water phase by a water-soluble reducing agent. Such catalysts are employed in a catalytic amount sufficient to cause polymerization.

Suitable emulsifying agents include anionic, cationic and nonionic emulsifiers customarily used in emulsion polymerization. Usually, one or more nonionic emulsifier(s) is utilized. Representative nonionic emulsifiers are sorbitan fatty acid esters, ethoxylated sorbitan esters, ethoxylated sorbitol and sorbitol esters, ethoxylated fatty acids, polyethylene glycol fatty acid esters, ethoxylated alcohols, ethoxylated alkyl phenols, ethoxylated triglycerides, ethoxylated alkanolamines, alkyl and glycol esters, glycerol esters and ethylene oxide/propylene oxide block copolymers. The emulsifying agents are employed in amounts effective to achieve adequate latex stability and to provide desired particle size and particle size distribution.

Other ingredients known in the art to be useful for various specific purposes in emulsion polymerization, such as acids, salts, chain transfer agents, pH buffers and chelating agents, can also be employed in the preparation of the polymer.

The manner of combining the polymerization ingredients can be by various known monomer feed methods, such as continuous monomer addition, incremental monomer addition, or addition in a single charge of the entire amount of monomers. The entire amount of the aqueous medium with polymerization additives can be present in the polymerization vessel before introduction of the monomer or, alternatively, the aqueous medium, or a portion of it, can be added continuously or incrementally during the course of polymerization.

Polymerization is initiated by heating the emulsified mixture with continued agitation to a temperature usually between about 30°–100° C., preferably between 50°–90° C. Polymerization is continued by maintaining the emulsified mixture at the selected temperature until conversion of the monomer or monomers to polymer has been substantially completed. Following polymerization, the solids content of the resulting emulsion polymer can be adjusted to the level desired by the addition of water or by removal of water by distillation.

While not intending to be limited by the following, clarity of the FRP generally is a function of the solubility of the sizing composition in the plastic resin. A FRP with improved clarity will contain less "white glass"; that is, the treated glass fibers will exhibit less gleam or glinting when subjectively observed. Therefore, it is desirable that the glass fibers be wetted completely by the plastic resin such that the fibers comprise a uniform residue of the sizing composition in order to produce less white glass and higher clarity. As is inferred by the term, wettability relates to the ease with which the plastic resin is distributed thoroughly upon the surface of the glass fibers. The greater the rate at which the fibers are wetted completely by the plastic resin, the better.

The sizing compositions will contain a major proportion of water, preferably greater than 50 weight percent. More preferably, the sizing compositions will contain greater than about 75 weight percent of water. The sizing compositions can contain from about 0.2 to about 2.0 weight percent of the polymers, based on the total weight of the sizing composition, preferably between about 0.5 to about 1.0 weight percent of the polymers.

The sizing compositions also may contain from about 0.01 to about 0.5 weight percent of a silane coupling agent, based on the total weight of the sizing composition, preferably from about 0.1 to about 0.5 weight percent of the coupling agent. Any suitable silane coupling agent, such as gamma-methacryloxypropyltrimethoxysilane, can be employed. An exemplary silane coupling agent is available from Union Carbide, Danbury, Conn., under the tradename Silane A-174. Other exemplary coupling agents include vinyltrichlorosilane, vinyltriethoxysilane, vinyltriacetoxysilane and vinyltrimethoxysilane, all available from Union Carbide.

The sizing compositions also may contain from about 0.05 to about 1.0 weight percent of a lubricant suitable for use in such sizing compositions, based on the total weight of the sizing composition, preferably from about 0.1 to about 0.25 weight percent of the lubricant. An exemplary cationic polyethyleneimine polyamide salt lubricant is commercially available from Henkel Corporation, Ambler, Pa., under the tradename Emery 6760.

The sizing compositions can contain from about 0.01 to about 0.05 weight percent of acetic acid, based on the total weight of the sizing composition, preferably from about 0.01 to about 0.03 weight percent of acetic acid. As those skilled in the art will appreciate, the compositions further may include other materials commonly used in sizing compositions, such as Werner-type chromium complexes, protective colloids, plasticizers, anti-foaming-agents, surfactants, and the like.

The sizing compositions may be applied by any methods known to those skilled in the art. They may be applied to the glass fiber filaments, to glass fiber strands or to glass fiber rovings. Glass fiber strands are formed when the continuous glass fiber filaments are gathered together in forming and typically contain from about 200–1600 filaments. Glass rovings typically contain from about 40–60 glass strands. Known methods of application are discussed in U.S. Pat. Nos. 3,997,306, 4,457,970 and 4,789,593, all of which are hereby incorporated by reference in their entirety.

The FRPs may be formed by any method known to those skilled in the art. Such methods are disclosed, for example, in U.S. Pat. Nos. 4,457,970 and 4,789,593. Preferably, the sized glass fibers are chopped to a desired length and incorporated into the plastic resin. The plastic resin may be any resin which is compatible with the sizing composition to yield the desired improved wettability and clarity described herein above. Preferred plastic resins are polyester resins, with styrenated polyvinyl esters being particularly preferred.

The following examples demonstrate certain embodiments of the invention, but are not intended to limit the scope of the invention, the scope of which is only limited by the claims appended hereto.

Preparation of Polymer Latexes

A series of polymer latexes was prepared via emulsion polymerization. Those Examples designated "A" are low molecular weight polymers utilized in the inventive sizing compositions. Those Examples designated "B" are comparative high molecular weight polymers utilized in comparative sizing compositions.

The monomer compositions are set forth in Table 1. Monomer compositions contained therein are given as weight percent, based on the total weight of monomer(s).

Sizing Compositions and Application

Sizing compositions were prepared for each polymer according to the following formulation:

| Components | Grams |
|---|---|
| Polymer Latex (50% solids) | 80.00 |
| Silane A-174 | 2.89 |
| Acetic acid | 0.20 |
| Emery 6760 | 1.40 |
| Water | 504.30 |

The sizing compositions were applied to unsized glass fiber strands at 2% solids based on the glass fiber weight. The strand was immersed in a bath of the sizing composition and passed through two squeeze rollers to remove excess size. The strand was wound onto a tube and allowed to air dry. After air drying, the glass was cured at 130° C. for 30 minutes. The glass was allowed to condition overnight at 50% relative humidity and 70° F. prior to preparing FRPs.

Lamination Resin

Polyester lamination resins were prepared according to the following formulation:

| Components | Grams |
|---|---|
| Resin MR-17090 | 800.00 |
| Cumene Hydroperoxide (80%) | 5.60 |
| Benzyltrimethylammonium Chloride (50%) | 1.44 |

FRP Preparation

The glass fiber strand was chopped to a length of 2 inches and incorporated into the plastic resin according to the following procedure at a level of 20% by weight, based on the total weight of the FRP. The sized, chopped glass fibers were placed on a flat panel and the plastic resin poured onto the chopped glass. The glass was worked into the resin with minimum force. The combination of the treated glass fibers and the plastic resin was covered by a second flat plate and pressed to a constant thickness. The combination was heated in a force draft oven at 80° C. for thirty minutes to effect curing. The cured FRP was removed from the oven and allowed to cool to room temperature.

FRP Clarity

The FRPs prepared from the respective high and low molecular weight polymers were visually evaluated for clarity and the presence of white glass. FRPs were rated subjectively as poor or good. Results are presented in Table 2.

Wetting Rate Evaluation

Glass fibers were treated with the respective sizing compositions to achieve a 2.5% solids addition by weight to the fibers. Styrenated polyester resin was placed in the light path of a photocell and the transmittance was set to 100%. The sized fibers were placed in the styrenated polyester resin, thereby causing the transmittance to drop to near zero initially. As the polymer residue on the glass fiber was wetted and dissolved by the polyester resin, the transmittance increased. The light transmittance was plotted as a function of time. The transmittance (%T) was reported at 2 minutes and 4 minutes. Results are presented in Table 2.

TABLE 1

| Example | Chemical Composition | Intrinsic Viscosity | (% T) 2 minutes | (% T) 4 minutes | Clarity Rating |
|---|---|---|---|---|---|
| 1A | 93 VA/1.3 BA/5.7 HPA | 0.20[1] | 43 | 53 | Good |
| 1B | 93 VA/1.3 BA/5.7 HPA | 0.47[1] | 39 | 45 | Poor |
| 2A | 94 VA/6 BA | 0.20[1] | 47 | 55 | Good |

TABLE 1-continued

| Example | Chemical Composition | Intrinsic Viscosity | (% T) 2 minutes | (% T) 4 minutes | Clarity Rating |
|---|---|---|---|---|---|
| 2B | 94 VA/6 BA | 0.80[1] | 39 | 45 | Poor |
| 3A | 98 VA/2 GMA | 0.22[1] | 44 | 52 | Good |
| 3B | 98 VA/2 GMA | 0.48[1] | 37 | 44 | Poor |
| 4A | 94 VA/6 HPA | 0.20[1] | 47 | 55 | Good |
| 4B | 94 VA/6 HPA | 0.75[1] | 41 | 47 | Poor |
| 5A | 100 VA | 0.27[2] | 43 | 52 | Good |
| 5B | 100 VA | 0.96[2] | 41 | 49 | Poor |
| 6A | 36 MMA/62 EA/2 GMA | 0.34[2] | 46 | 54 | Good |
| 6B | 55 MMA/43 EA/2 GMA | 1.30[2] | 44 | 51 | Poor |
| 7A | 57 MMA/43 EA | 0.24[2] | 51 | 60 | Good |
| 7B | 37 MMA/63 EA | 0.45[2] | 49 | 56 | Poor |
| 8A | 52 STY/45 EA/3 MMA | 0.20[2] | 57 | 66 | Good |
| 8B | 54 STY/43 EA/3 MMA | 0.50[2] | 54 | 62 | Poor |

1. Intrinsic Viscosity in acetone
2. Intrinsic Viscosity in THF/water
VA = vinyl acetate
EA = ethyl acrylate
BA = butyl acrylate
HPA = hydroxypropyl acrylate
GMA = glycidyl methacrylate
STY = styrene It is noted that Examples 3A, 3B and 6A had weight average molecular weights of 25,100, 56,400 and 53,400, respectively, as determined by gel permeation chromatography. As the data indicate, in every case, FRPs prepared from glass fibers which have been sized with the compositions of the present invention (i.e., low molecular weight polymers) have improved clarity over FRPs prepared from glass fibers which have been sized with compositions containing high molecular weight polymers.

Furthermore, the rate at which the sized glass fibers are wet by the plastic resin are higher when the inventive size compositions are utilized, when compared to size compositions utilizing high molecular weight polymers.

We claim:

1. Glass fibers which are used to prepare a fiber-reinforced plastic which contains a plastic resin, wherein the glass fibers comprise a residue of a sizing composition, the sizing composition comprising a polymer prepared from at least one monomer(s) selected from the group consisting of acrylic acid, methacrylic acid, $C_1$–$C_{18}$ alkyl esters of acrylic acid, $C_1$–$C_{18}$ alkyl esters of methacrylic acid, glycidyl acrylate, glycidyl methacrylate, $C_1$–$C_4$ hydroxyalkyl esters of acrylic acid, $C_1$–$C_4$ hydroxyalkyl esters of methacrylic acid, vinyl esters of saturated aliphatic monocarboxylic acids containing up to 10 carbon atoms, (meth)acrylamide and their N-substituted derivatives, vinyl ethers, N-vinyl lactams, halogenated vinyl compounds, alkyl vinyl ketones, (meth)allyl ester of saturated aliphatic monocarboxylic acids, vinyl pyrrole, olefins, diesters of itaconic, maleic and/or fumaric acid, and styrene, the polymer having a weight average molecular weight of not more than 55,000, as determined by gel permeation chromotography; and an ingredient selected from the group consisting of a silane coupling agent, a lubricant suitable for use in the sizing composition and acetic acid, wherein the fiber-reinforced plastic prepared from the sized glass fibers and the plastic resin exhibit improved clarity compared to fiber-reinforced plastics prepared from glass fibers which comprise the residue of the sizing composition which utilizes a polymer of similar composition and having a weight average molecular weight of greater than 55,000.

2. Fiber-reinforced plastics comprising a plastic resin and glass fibers, which glass fibers comprise the residue of a sizing composition, the sizing composition comprising a polymer prepared from at least one monomer(s) selected from the group consisting of acrylic acid, methacrylic acid, $C_1$–$C_{18}$ alkyl esters of acrylic acid, $C_1$–$C_{18}$ alkyl esters of methacrylic acid, glycidyl acrylate, glycidyl methacrylate, $C_1$–$C_4$ hydroxyalkyl esters of acrylic acid, $C_1$–$C_4$ hydroxyalkyl esters of methacrylic acid, vinyl esters of saturated aliphatic monocarboxylic acids containing up to 10 carbon atoms, (meth)acrylamide and their N-substituted derivatives, vinyl ethers, N-vinyl lactams, halogenated vinyl compounds, alkyl vinyl ketones, (meth)allyl ester of saturated aliphatic monocarboxylic acids, vinyl pyrrole, olefins, diesters of itaconic, maleic and/or fumaric acid, and styrene, the polymer having a weight average molecular weight of not more than 55,000, as determined by gel permeation chromotography; and an ingredient selected from the group consisting of a silane coupling agent, a lubricant suitable for use in the sizing composition and acetic acid, wherein the fiber-reinforced plastics prepared from the sized glass fibers and the plastic resin exhibit improved clarity compared to fiber-reinforced plastics prepared from glass fibers which comprise the residue of a sizing composition which utilizes a polymer of similar composition and having a weight average molecular weight of greater than 55,000.

* * * * *